United States Patent [19]
Meiser et al.

[11] Patent Number: 5,865,512
[45] Date of Patent: Feb. 2, 1999

[54] METHOD AND APPARATUS FOR MODIFYING THE FEEDBACK GAINS OF A TRACTION CONTROL SYSTEM

[75] Inventors: Matthew E. Meiser, Peoria; Michael G. Seil, Naperville; Ronald D. Brown, Peoria, all of Ill.

[73] Assignee: Caterpillar Inc., Peoria, Ill.

[21] Appl. No.: 708,618

[22] Filed: Sep. 5, 1996

[51] Int. Cl.⁶ ................................................ B60K 28/16
[52] U.S. Cl. ........................ 303/139; 701/83; 180/197; 180/235; 180/244; 280/400
[58] Field of Search ................. 303/139, 113.2, 303/122.07, 123; 180/197, 235, 244; 280/400, 432; 364/426.03, 426.01, 424.07; 701/71, 82, 83

[56] References Cited

U.S. PATENT DOCUMENTS 5,535,124  7/1996  Hosseini et al. .................... 364/426.03

Primary Examiner—Peter M. Poon
Attorney, Agent, or Firm—David M. Masterson

[57] ABSTRACT

A traction control system for a machine having two driven wheels is disclosed. Braking mechanisms controllably apply braking forces to each of the driven wheels. Transducers produce an actual speed signal having a value proportional to the rotational velocity of each driven wheel. A microprocessor produces a desired speed signal having a value representative of a desired rotational velocity of each driven wheel, and an error signal representative of the difference between the values of the desired and actual speed signals. The microprocessor additionally multiplies the error signal by a gain value and produces a braking command signal to the braking mechanism to apply braking forces to a slipping wheel. The present invention provides the advantage of modifying the gain value based on machine operating conditions in order to achieve good performance.

14 Claims, 6 Drawing Sheets

Fig_3

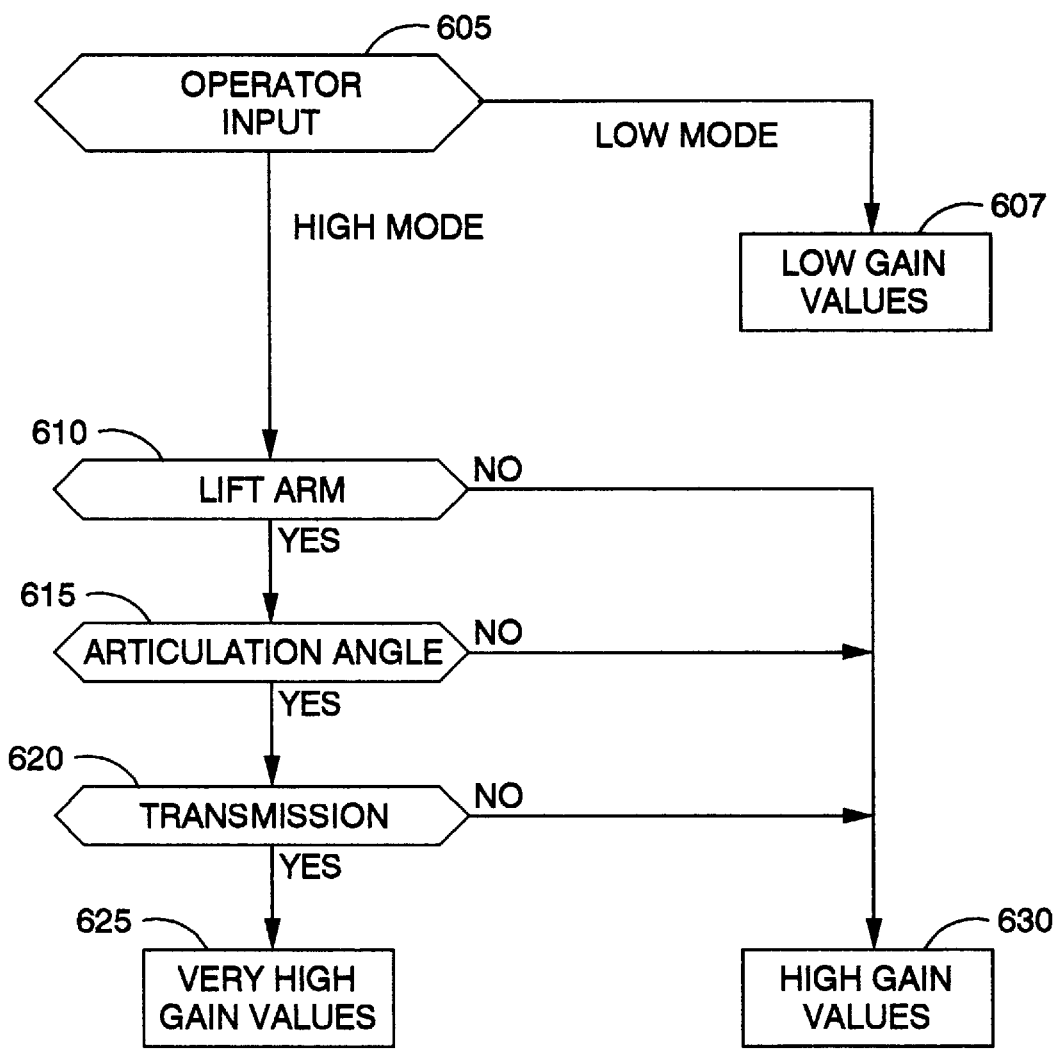
Fig_b_

METHOD AND APPARATUS FOR MODIFYING THE FEEDBACK GAINS OF A TRACTION CONTROL SYSTEM

TECHNICAL FIELD

This invention relates generally to a traction control system that utilizes PID feedback control and, more particularly, to a traction control system that modifies the gain values associated with the PID feedback control.

BACKGROUND ART

Machines used in construction sites and other off-road locations generally experience loss of traction. Moreover, four wheel drive machines used in these locations also experience traction loss. For example, slipping occurs to either the front wheels or rear wheels, or to all four wheels.

For example, a machine typically used on construction sites is a wheel loader. Wheel loaders commonly have four driven wheels and are often articulated. As is well known, an articulated machine includes front and rear body parts hinged together by an articulation joint for relative movement about a vertical axis. Each body part includes a wheel set. When one of the body parts move relative to the other, the machine turns. During normal operation a wheel loader may experience wheel-slip to all four wheels, especially when loading.

The present invention is directed to overcoming one or more of the problems as set forth above.

DISCLOSURE OF THE INVENTION

In one aspect of the present invention, a traction control system for a machine having at least two driven wheels is disclosed. Braking mechanisms controllably apply braking forces to each of the driven wheels. Transducers produce actual speed signals having values proportional to the rotational velocity of each driven wheel. A microprocessor calculates a desired speed signal having a value representative of a desired rotational velocity of each driven wheel and an error signal representative of the difference between the values of the desired and actual speed signals. The microprocessor additionally multiplies the error signal by a gain value and produces a braking command signal to the braking mechanism to apply braking forces to the slipping rotating wheel. The present invention provides the advantage of modifying the gain value based on operating conditions in order to improve the traction control performance.

In another aspect of the present invention a traction control system for a machine having an internal combustion engine, a transmission and an implement is disclosed. The implement is actuated by a hydraulic lift cylinder. The machine additionally includes at least two driven wheels and associated braking mechanisms. A lift position sensor produces a lift position signal having a value responsive to the elevational position of the implement. Transducers produce actual speed signals having values proportional to the rotational velocity of each driven wheel. A microprocessor calculates a desired speed signal having a value representative of a desired rotational velocity of each driven wheel and an error signal representative of the difference between the values of the desired and actual speed signals. A memory device stores a plurality of gain values. The microprocessor receives the lift position signal and selects an appropriate gain value. The microprocessor additionally multiplies the error signal by the selected gain value and produces a braking command signal to the braking mechanisms to apply braking forces to the faster slipping wheel.

BRIEF DESCRIPTION OF THE DRAWINGS

For a better understanding of the present invention, reference may be made to the accompanying drawings in which:

FIG. 6 is a block diagram of a computer program associated with an embodiment of the present invention that modifies the gain values of the PID feedback control.

BEST MODE FOR CARRYING OUT THE INVENTION

Figure 1:
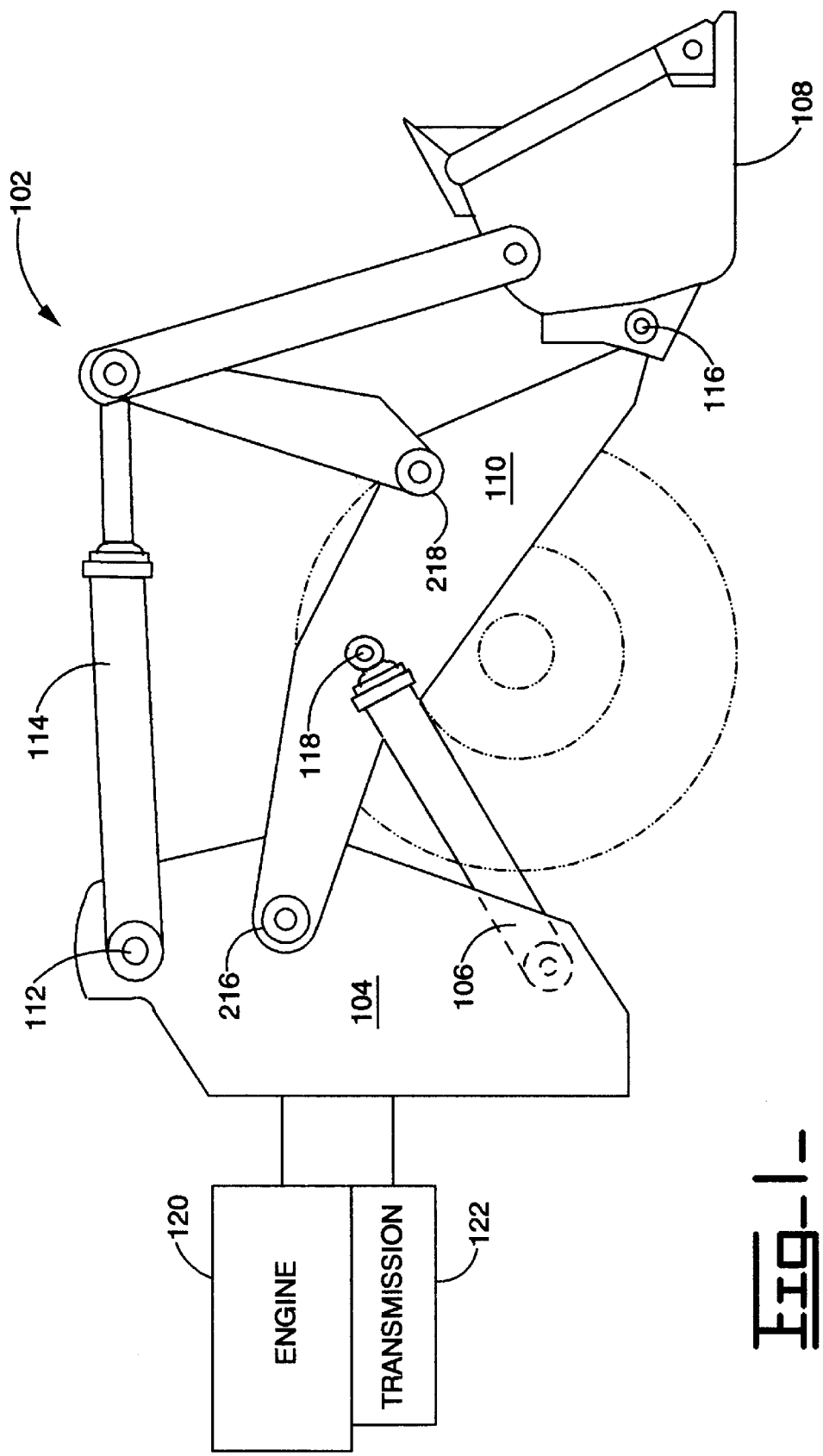
FIG. 1 is a side view of a forward portion of a loader machine or wheel type loader.

FIG. 1 shows a forward portion of a wheel type loader machine 104 having a payload carrier in the form of a bucket 108. Although the present invention is described in relation to a wheel-type loader machine, the present invention is equally applicable to many other "wheel-type" earth moving machines, such as integrated tool carriers. As shown, the bucket 108 is connected to a lift arm assembly or lift arm 110, which is pivotally actuated by two hydraulic lift actuators or cylinders 106 (only one of which is shown) about a lift arm pivot pin 112 that is attached to the machine frame. A lift arm load bearing pivot pin 118 is attached to the lift arm 110 and the lift cylinders 106. The bucket 108 is tilted by a bucket tilt actuator or cylinder 114 about a tilt pivot pin 116.

The wheel loader 104 is powered by an internal combustion engine 120 that transfers rotational energy to a set of drive wheels via a transmission.

Figure 2:
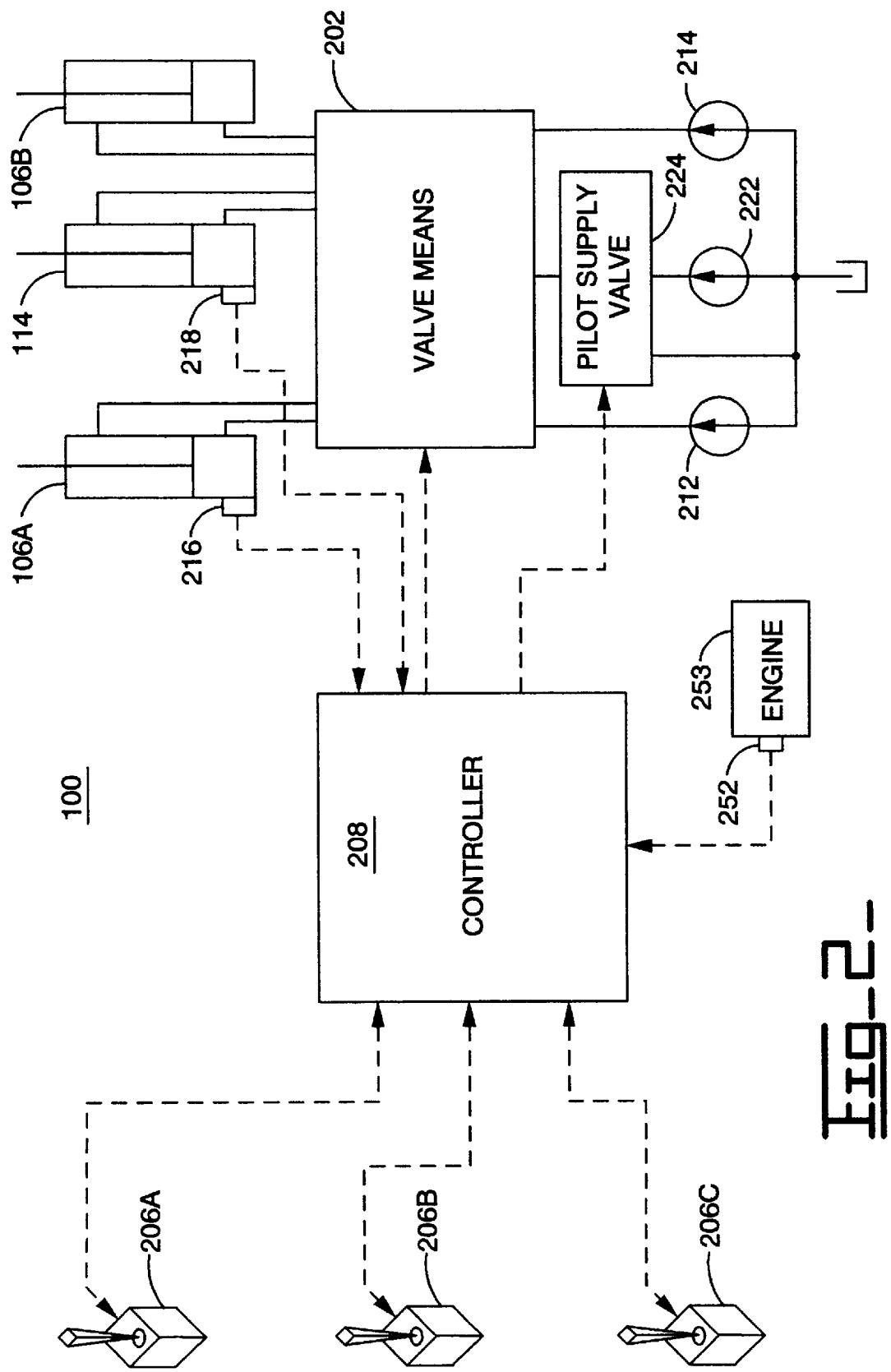
FIG. 2 is a block diagram of an electrohydraulic control system of the wheel loader.

With reference to FIG. 2, an implement control system is diagrammatically illustrated. Preferably, the implement control system includes a microprocessor based controller 208.

First, second, and third joysticks 206A,206B,206C provide operator control over the work implement 102. The joysticks include a control lever 219 that has movement along a single axis. However, in addition to movement along a first axis (horizontal), the control lever 219 may also move along a second axis which is perpendicular to the horizontal axis. The first joystick 206A controls the lifting operation of the lift arm 110. The second joystick 206B controls the tilting operation of the bucket 108. The third joystick 206C controls an auxiliary function, such as operation of a special work tool.

Implement position sensors 216,218 produce lift and tilt position signals in response to the position of the work implement 102 with respect to the work machine 104. In the preferred embodiment, the implement position sensors 216, 218 include a lift position sensor 216 for sensing the elevational position of the lift arm 110 and a tilt position sensor 218 for sensing the pivotal position of the bucket 108.

In one embodiment, the lift and tilt position sensors 216,218 include rotary potentiometers. The rotary potentiometers produce pulse width modulated signals in response to the angular position of the lift arm 110 with respect to the machine 104 and the bucket 108 with respect to the lift arm 110. The angular position of the lift arm is a function of the lift cylinder extension 106A,B, while the angular position of the bucket 108 is a function of both the tilt and lift cylinder extensions 114,106A,B. The function of the sensors 216,218 can readily be accomplished by any other sensor which is capable of measuring, either directly or indirectly, the relative extension of a hydraulic cylinder. For example, the potentiometers could be replaced with radio frequency (RF) sensors disposed within the hydraulic cylinders.

A valve means 202 is responsive to electrical signals produced by the controlling means and provides hydraulic fluid flow to the hydraulic cylinders 106A,B,114.

Figure 3:
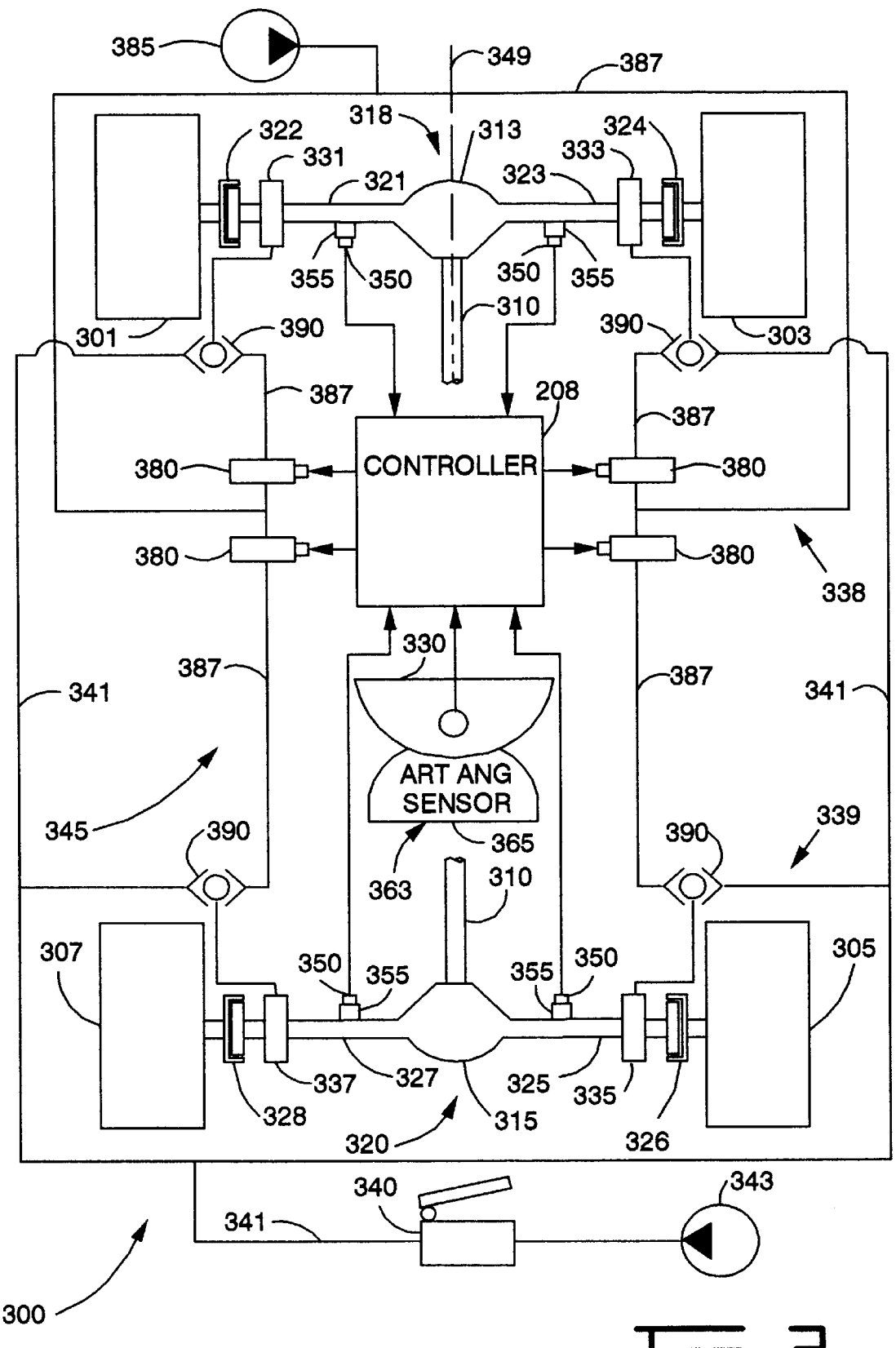
FIG. 3 shows a schematic view of the wheel loader drive system including a traction control system.

Referring now to FIG. 3, an automated traction control system 300 embodying certain principles of the present invention is illustrated. Wheels 301,303,305,307 are driven by an internal combustion engine 120 via transmission 122 through an input or drive shaft 310 to respective differential mechanisms 313,315 and respective axle sets 318,320 which include final drive assemblies 322,324,326,328, respectively. The axle sets 318,329 also include braking mechanisms 331,333,335,337. The axle set may have "inboard" or "outboard" brake and final drive assemblies. For example and as shown in FIG. 3, the outboard assembly includes the braking mechanism and the final drive assembly in close proximity to the wheel with the half-axle connected between the differential and the braking mechanism. Alternatively, the inboard assembly (not shown) includes the braking mechanism and final drive in close proximity to the differential. The drive systems disclosed are conventional and no further details need be disclosed for an understanding of the present invention.

The machine is articulated and includes front and rear wheeled sections 338,339 hinged together by an articulation joint or mechanism 330 for relative movement about a vertical axis 349, thus enabling the machine to be steered.

The wheels 301,303,305,307 are stopped by hydraulically engaged service brake pistons, of braking mechanisms 331, 333,335,337. The brakes may be spring-biased in the engaged position and maintained in the disengaged position by application of fluid pressure. Alternatively, the brakes may be maintained in the engaged position by the application of fluid pressure and spring-biased in the disengaged position. The method of engaging the brakes will vary from machine to machine and is not critical to the present invention. The service brakes are normally actuated by a brake pedal 340 via a service brake line 341 connected to the service brake. The fluid is pressurized and is supplied by the service pump 343. The service brake system is well known and does not form a part of this invention.

A transducer 345 produces an actual speed signal having a value proportional to the rotational velocity of each wheel of each respective axle set. As shown and in the case of the outboard axle design, the transducer 345 includes a wheel speed pickup in the form of a Hall effect device 350 which provides pulses in cooperation with a gear-like device 355. The device 355 is mounted on each axle portion 321,323, 325,327.

Each transducer 345 produces respective signals having values responsive to the rotational speed or velocity of the wheels 301,303,305,307. All the wheel speed signals for each wheel 301,303,305,307 are provided in a similar manner. Moreover, the wheel speed signals for each wheel are applied to an input of the controller 208. For example, each transducer 345 is preferably a Hall effect device. However, other transducers, such as optical or electromagnetic devices may be employed as alternatives.

An angular position sensor 363 produces an articulation signal having a value responsive to the angle of articulation of the machine. The angular position sensor 363 preferably includes a potentiometer 365 controllably connected to the articulation mechanism 330. Other suitable angular position sensors may be substituted for the potentiometer 365, as is well known in the art.

The controller 208 produces a braking command signal in response to detecting a loss of traction situation. Accordingly, the braking mechanisms 331,333,335,337 receive the braking command signal and controllably apply braking forces to the faster rotating driven wheel 301,303, 305,307 to regulate the wheel slip of the machine during the loss of traction situation.

The controller 208 operates upon the signal inputs, determines the existence, magnitude, and location of wheel-slip during a loss of traction situation, and distinguishes between true wheel-slip and a transducer failure. In response to detecting a true slip condition, the power transfer between two differentially driven wheels is balanced by applying a proportional braking force to the wheel which loses traction, i.e., the slipping wheel. This is accomplished by the braking mechanisms 331,333,335,337, and more particularly, via actuating the appropriate electrohydraulic control valves 380.

The electrohydraulic control valves 380 operate in combination with a supply pump 385, which may be part of the service pump 343. The supply pump 385 supplies pressurized oil or brake fluid. Fluid lines 387 from the pump 385 run through the hydraulic valves 380 and check valves 390 directing pressure to one of the braking mechanisms 331, 333,335,337 under modulated or proportionally controlled pressure. The check valves 390 are ball-type check valves and the electrohydraulic brake valves are solenoid operated three-way valves; both types of valves are well known in the art and will not be further discussed.

Figure 4:
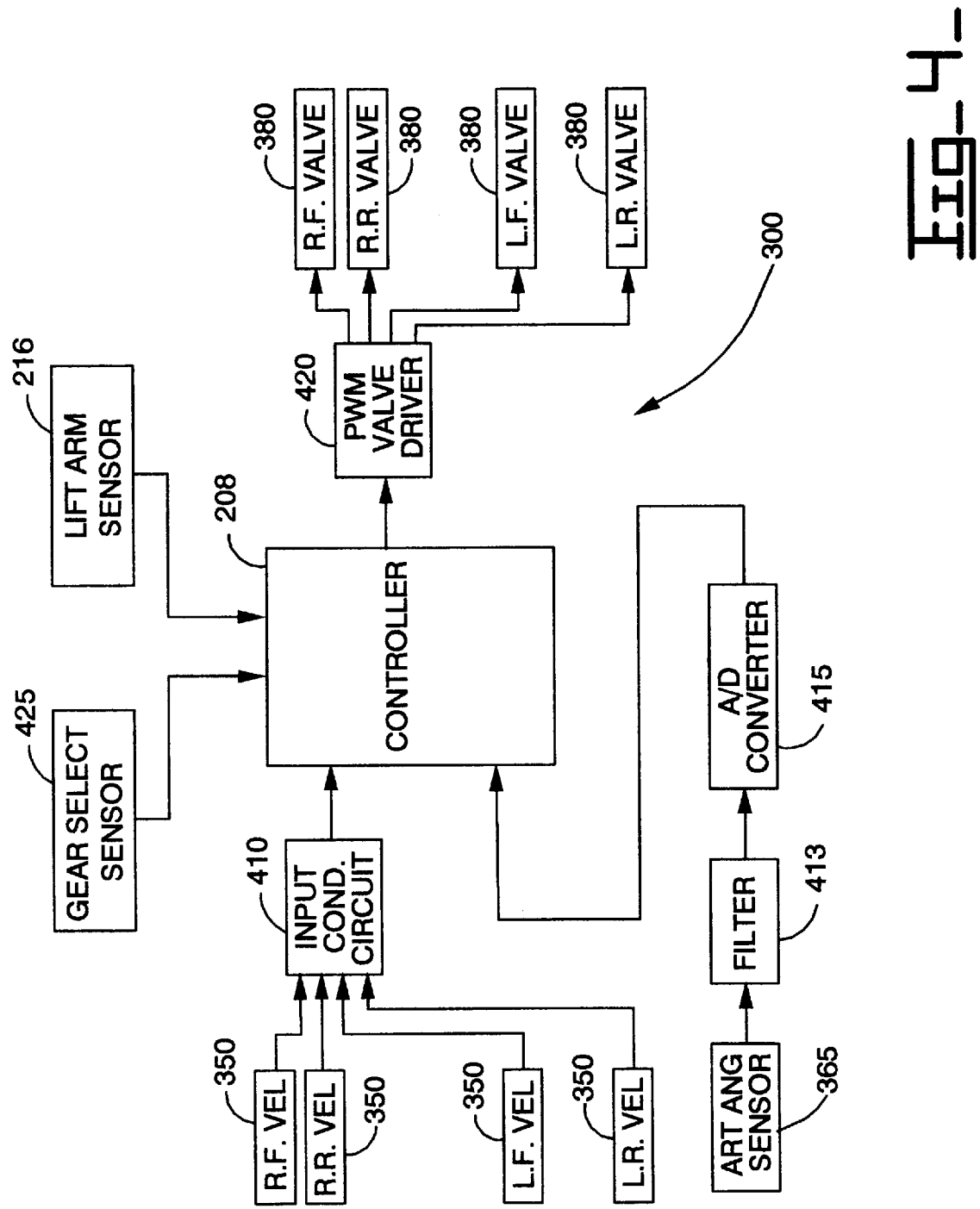
FIG. 4 shows a block diagram of the electronic circuitry associated with the traction control system.

FIG. 4 is a block diagram of the automated traction control system 300 described above. The controller 208 may include one or more microprocessors, e.g., one separate microprocessor dedicated for use by the implement control system and another microprocessor dedicated for use by the automated traction control system. The implement, transmission, and traction control systems may communicate to each other and transmit data between one another by using a 16-bit data link, for example. The microprocessors are similar to those supplied by Motorola as Part No. 68HC11. However another microprocessor, such as Motorola's No. 6809, may be substituted as one skilled in the art can readily appreciate.

Transducers 350 which supply the wheel speed signals are connected to the controller 208 through an input conditioning circuit 210. The input circuit 210 provides appropriately digitized input signals to the controller 208. The articulation angle sensor 365 is connected to a low pass filter 413 through an A/D converter 415 to the controller 208. The lift arm sensor 216 is connected to the controller 208, as well as, a gear selection sensor 425. The gear selection sensor 425 produces a gear select signal in response to the position of a gear selection device (not shown). The gear selection device is used by the operator to select the desired gearing of the wheel loader transmission.

A first output of the controller 208 is connected through a pulse-width modulated servo valve driver 420 associated with each electrohydraulic control valve 380. The pulse-width modulated servo valve drivers 420 receive the braking command signal produced by the controller 208 and proportionally control the respective electrohydraulic valves 380 in response to the braking command signal.

Advantageously, the applied braking forces are modulated in response to the modulation or duty cycle of the braking command signal. For example, the controller 208 controls the energization of the electrohydraulic brake valves 380 via the braking command signal providing pressurized fluid to the respective service brakes.

Figure 5:
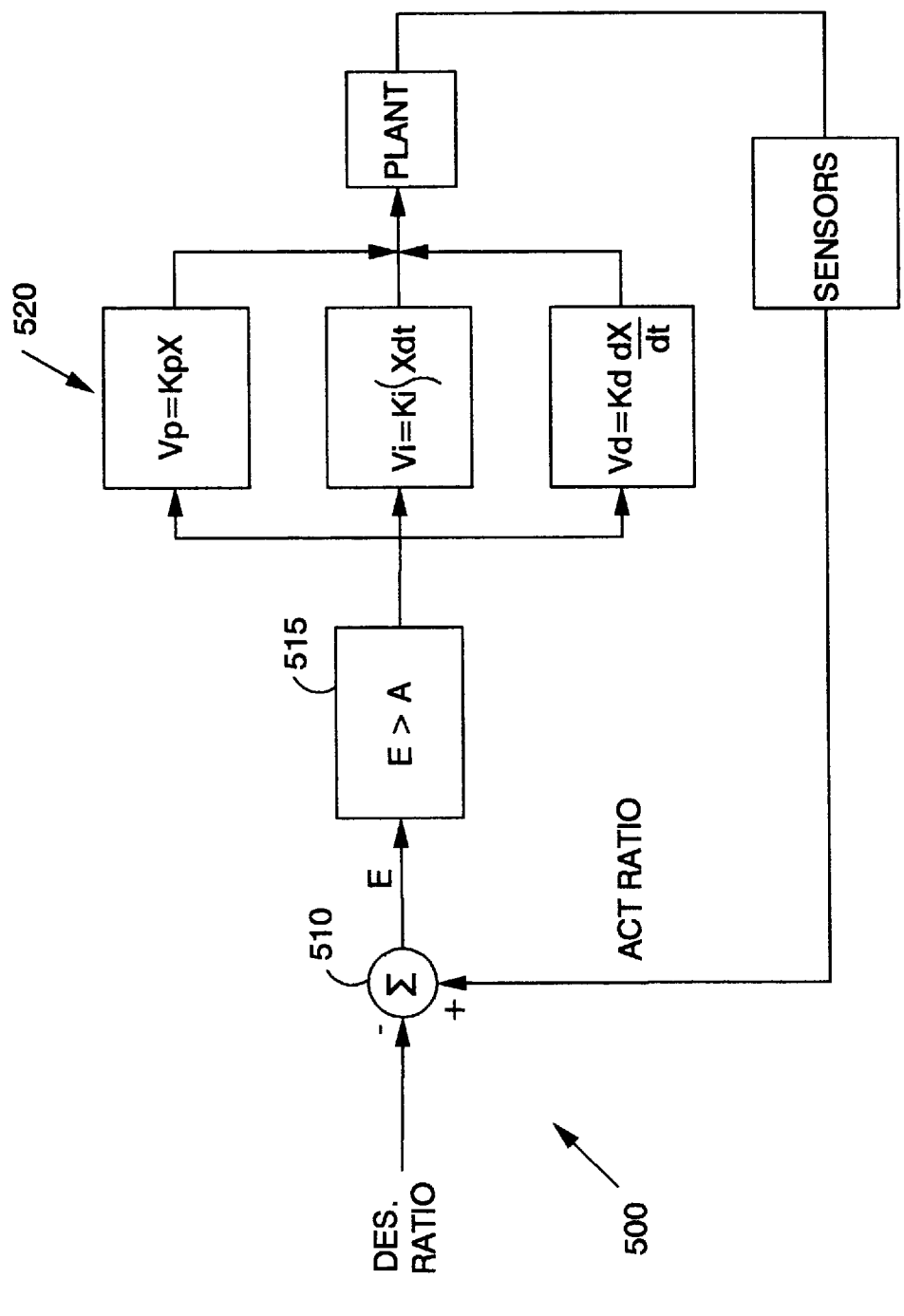
FIG. 5 is a block diagram of a PID feedback control associated with the traction control system.

Reference is now made to FIG. 5 which shows a block diagram of the Proportional+Integral+Derivative (PID) control 500. The PID control is used to determine the magnitude of the braking forces that are applied to the slipping wheel.

The PID control first compares the desired speed signal (DES) to the actual speed signal (ACT) at summing junction 510. The desired speed represents an ideal speed of a particular wheel and may be responsive to the machine articulation angle. The actual speed signal represents the actual speed of the particular wheel. The summing junction 510 produces a error signal, E, which represents the difference between the desired speed and the actual speed signals. Assuming the value of the error signal, E, is greater than a first predetermined reference value, A, then the error value is delivered to the PID block 520. The PID block 520 is represented by the equation, $V=V_p+V_i+V_d$. The result, V, is converted to a braking command signal that is delivered to the electrohydraulic valve to produce the desired result. For example, the braking command signal is representative of a desired braking force that is to be applied to the slipping wheel, i.e., a wheel that is spinning faster than its ideal speed.

The present invention is directed towards modifying the PID gain values or constants $K_p$, $K_i$, and $K_d$ in response to machine operating conditions. For example, depending on the underfooting conditions, the present invention selects the appropriate PID gain values to optimize the characteristics of the feedback control. Reference is now made to FIG. 6, which shows a block diagram of a preferred embodiment of the present invention that modifies the gain values. The block diagram represents a computer program that resides in RAM or ROM contained in the controller 208.

At block 605, the program determines whether the operator has chosen a high mode or low mode setting via an operator selectable switch. For example, the low mode setting is used for slippery underfooting conditions such as snow, ice and mud, and the high mode setting is used for normal underfooting conditions. The low mode setting utilizes low gain PID values, represented by block 607; while the high mode setting utilizes high gain PID values, represented by block 630. By using high gain PID values, the traction control system is able to respond faster to brake a slipping wheel—as opposed to using low gain PID values.

However in certain circumstances, such as while the wheel loader is digging, it is desirable to have the traction control system respond even faster. Thus, the present invention determines when the wheel loader is digging and selects even more aggressive PID gain values to provide for the PID control to quickly produce the command signal. This is represented by blocks 610–625.

Assuming the operator has selected the high mode setting, control transfers to block 610 where the program determines whether the lift arm position is below a predetermined value. If the lift arm position is below a predetermined position, then the lift arm is said to be at the digging position and the program transfers to block 615. The program then determines whether the articulation angle is less than a predetermined angle. If the articulation angle is less than a predetermined value, then the articulation angle is small enough where the wheel loader is said to be digging. Control then transfers to block 620 where the program determines whether transmission is engaged in first or second gear forward, or more particularly, whether the gear selection device is set to first or second gear forward. If the gear selection device is set to first or second gear forward, then the wheel loader is in a low enough gear range to dig. Thus, the decisional blocks 610, 615, and 620 are used to determine whether the wheel loader is likely digging. If the wheel loader is likely digging, then the program uses very high PID gain values, represented by block 625.

Depending upon the above decisions, the program selects the appropriate gain values that are written into the program itself or written in two-dimentional look-up tables stored in RAM or ROM. The gain values are determined from simulation and analysis of empirical data in response to under footing conditions and machine dynamics. Thus the gain values may be chosen from a wide range of numerical values depending on the desired gain of the feedback system.

Further, blocks 610–625 may also provide useful information to the traction control system in order to perform another operation. For example, under such conditions found in blocks 610–625, the controller 208 may deliver a braking command signal with a relatively small magnitude to each control valve 380 in order to remove the "running clearance" between the brake pads and the disk or drum. This would provide for a faster response of the traction control system to regulate a slipping wheel.

Note, although a PID control is shown and discussed, it will be apparent to those skilled in the art that the either the $K_i$ or $K_d$ terms may be set to zero; thereby, resulting in a PI or PD control.

Industrial Applicability

The present invention is well suited toward regulating the wheel-slip of an articulated machine such as a wheel loader, for example, a wheel loader provided by Caterpillar, Inc. as model no. 966F.

As discussed above, the traction control system reads the individual wheel speeds, calculates a desired wheel speed and an actual wheel speed. Based on feedback control, an error value is determined. In response to the magnitude of the gain and error value, the control determines the positive braking forces to equalize the torque on the respective wheel set.

One benefit of the present invention pertains to the aspect of using PID feedback control. The $V_p$ term of the PID control leads to a proportional gain which provides for a fast response. The $V_i$ term of the PID control cancels any offset in error introduced by the $V_p$ term, thus providing for control stability. The $V_d$ term enhances the response characteristics of the control. The result provides for a wheel-slip control which eliminates wheel-slip quickly and without the undesirable effects of brake "pulsing". Thus, the PID control determines the magnitude and the rate at which the braking force is to be applied.

The present invention selects the appropriate PID gain values to optimally regulate the feedback control in response to the type of work performed by the wheel loader. To this end, the traction control system has two settings, a high mode setting and a low mode setting, to provide the traction control system with the desired flexibility to produce the preferred results. Further, if it is determined that the wheel loader is digging, then the present invention modifies the PID gain constants to achieve even greater control of wheel slippage. Thus, the traction control system has the versatility to improve its performance based on current operating conditions.

Other aspects, objects and advantages of the present invention can be obtained from a study of the drawings, the disclosure and the appended claims.

We claim:

1. A traction control system for a machine having two driven wheels, comprising:
   braking mechanisms controllably applying braking forces to each of the driven wheels;
   transducers producing actual speed signals having values proportional to the rotational velocity of a respective driven wheel;
   means for producing a desired speed signal having a value representative of a desired speed of a respective driven wheel;
   means for producing an error signal representative of the difference between the values of the desired and actual speed signals;
   means for receiving the error signal, multiplying the error signal by a gain value, and producing a braking command signal to the braking mechanisms to apply braking forces to a slipping wheel; and
   means for modifying the gain value in response to machine operating conditions.

2. A traction control system, as set forth in claim 1, wherein the gain value is selectable from a range of values between high gain and low gain characteristics.

3. A traction control system, as set forth in claim 2, including means for determining a desired amount of braking force to apply to the slipping wheel using Proportional+Integral+Derivative (PID) control having PID gain values $K_p$, $K_i$, and $K_d$.

4. A traction control system, as set forth in claim 3, wherein the machine includes an internal combustion engine, a transmission, an implement having a lift arm and a bucket, the lift arm being actuated by a hydraulic lift cylinder and the bucket being actuated by a hydraulic tilt cylinder, and a lift position sensor that produces a lift position signal in response to the elevational position of the lift arm.

5. A traction control system, as set forth in claim 4, wherein the machine further includes front and rear wheeled sections hinged together by an articulation mechanism for relative movement about a vertical axis, and an angular position sensor that produces an articulation signal having a value responsive to the angle of articulation of the machine.

6. A traction control system, as set forth in claim 5, including means for storing a plurality of gain values, receiving the lift position signal, receiving the articulation angle signal, receiving a gear selection signal, determining whether the machine is digging, and selecting the appropriate gain value in response to the machine digging.

7. A traction control system for a machine having an internal combustion engine, a transmission and an implement being actuated by a hydraulic lift cylinder, the machine including two driven wheels and associated braking mechanisms; comprising:
   a lift position sensor that produces a lift position signal having a value responsive to the elevational position of the implement;
   transducers producing actual speed signals having values proportional to the rotational velocity of each driven wheel;
   means for producing a desired speed signal having a value representative of a desired rotational velocity of each driven wheel;
   means for producing an error signal representative of the difference between the values of the desired and actual speed signals;
   means for storing a plurality of gain values;
   means for receiving the lift position signal, determining the machine operating condition, and selecting an appropriate gain value; and
   means for receiving the error signal, multiplying the error signal by the selected gain value, and producing a braking command signal to the braking mechanisms to apply braking forces to the slipping wheel.

8. A traction control system, as set forth in claim 7, wherein the machine includes front and rear wheeled sections hinged together by an articulation mechanism for relative movement about a vertical axis, including an angular position sensor that produces an articulation signal having a value responsive to the angle of articulation of the machine.

9. A traction control system, as set forth in claim 8, wherein the machine includes a gear selection device sensor that produces a gear select signal indicative of a desired range of transmission gearing.

10. An traction control system, as set forth in claim 9, including means for receiving the lift position signal and determining whether the implement position is below a predetermined position, receiving the articulation angle signal and determining whether the articulation angle is less than a predetermined angle, receiving the gear selection signal and determining whether gear selection device is set to first or second gear forward, and responsively selecting the appropriate gain value.

11. A traction control system, as set forth in claim 10, including means for determining a desired amount of braking force to apply to the slipping wheel using Proportional+Integral+Derivative (PID) control having PID gain values $K_p$, $K_i$, and $K_d$.

12. A traction control method for a machine having two driven wheels that includes associated braking mechanisms, comprising the steps of:
   producing actual speed signals having values proportional to the rotational velocity of a respective driven wheel;
   producing a desired speed signal having a value representative of a desired speed of a respective driven wheel;
   producing an error signal representative of the difference between the values of the desired and actual speed signals;
   receiving the error signal, multiplying the error signal by a gain value, and producing a braking command signal to the braking mechanisms to apply braking forces to a slipping wheel; and
   modifying the gain value in response to machine operating conditions.

13. A traction control method, as set forth in claim 12, including the step of storing a plurality of gain values and selecting the gain value from the stored values.

14. A traction control method, as set forth in claim 13, including the step of determining a desired amount of braking force to apply to the slipping wheel using Proportional+Integral+Derivative (PID) control having PID gain values $K_p$, $K_i$, and $K_d$.

* * * * *